United States Patent
Stripling et al.

[15] 3,653,737
[45] Apr. 4, 1972

[54] OPTICAL SCANNING SEEKER

[72] Inventors: William W. Stripling; Lester M. Ross, both of Huntsville, Ala.

[73] Assignee: The United States of America as represented by the Secretary of the Army

[22] Filed: Aug. 24, 1970

[21] Appl. No.: 66,203

[52] U.S. Cl.................................350/7, 350/287, 250/203, 250/236
[51] Int. Cl.......................................G02b 17/00
[58] Field of Search.........................350/6, 7, 285, 286, 287; 250/203, 236

[56] References Cited

UNITED STATES PATENTS

| | | | |
|---|---|---|---|
| 2,967,246 | 1/1962 | Ostergren | 250/203 |
| 3,453,442 | 7/1969 | Spangenberg | 250/203 |
| 3,330,958 | 7/1967 | Kaisler et al. | 250/203 |

*Primary Examiner*—David Schonberg
*Assistant Examiner*—Michael J. Tokar
*Attorney*—Edward J. Kelly, Harry M. Saragovitz, Herbert Berl and Aubrey J. Dunn

[57] ABSTRACT

In an optical scanning target seeker, optical elements carried within a spinning gyroscopic mass scan the seeker field of view. The seeker spin axis is defined by the gyroscopic mass spin axis. The optical elements are positioned along the gyroscopic mass spin axis, or seeker spin axis, and include a parabolic reflector cut in a face of the gyroscopic mass, a slanted mirror mounted facing the parabolic reflector, and a focusing lens for focusing images reflected from the slanted mirror onto a detector. As the gyroscopic mass spins, energy beams from the seeker field of view are reflected off the slanted mirror and through the focusing lens in a circular sweep pattern. The novelty of this invention is in rotating a prism between the focusing lens and detector on an axis that is orthogonal to the seeker spin axis. The rotating prism changes the circular sweep pattern to curved radial beams and sweeps the beams over the detector. A target image is displayed on one of the beams when a target is present in the seeker field of view. Magnetic sensors react with magnets on the rotating gyroscopic mass and on the prism to indicate where a target is located in the seeker field of view when an image from the target is displayed on the detector.

2 Claims, 7 Drawing Figures

William W. Stripling
Lester M. Ross,
INVENTORS.

OPTICAL SCANNING SEEKER

BACKGROUND OF THE INVENTION

This invention is in the field of inertially stabilized target seekers. Such target seekers find use in homing guided missile systems. Homing guided missiles must be capable of receiving radiated energy from a target and have electronics for processing the target energy into output signals for torquing the seeker toward the target. A well known seeker, for example, is inertially stabilized by spinning the gimballed seeker reflector with the reflector being, in effect, a two-degree-of-freedom gyro. A problem of this well known seeker is in accurately locating returned target energy with respect to the total field of view. Prior to torquing the seeker toward the target, the seeker field of view should be scanned in some selected pattern by an energy detector for accurately establishing the location of the target. The present invention avoids the problems of the known seekers.

SUMMARY OF THE INVENTION

The present invention is an optical scanning target seeker that has optical elements carried within a spinning gyroscopic mass for scanning the seeker field of view. The field of view of the seeker is controlled by the self-stabilized gyroscopic mass that carries the optical elements therein. The seeker spin axis is defined by the gyroscopic mass spin axis. The optical elements are positioned along the seeker spin axis, and include a parabolic reflector in a face of the rotating gyroscopic mass, a slanted mirror facing the parabolic reflector, and a focusing lens for focusing images reflected from the slanted mirror onto a detector. The novelty of this invention is in the addition of a rotating prism that rotates on a spin axis orthogonal to the seeker spin axis and between the focusing lens and detector. The gyroscopic mass and prism are driven by separate motors that are synchronized with each other to sweep curved radial beams of the seeker field of view over the detector for indicating the position of a target with a high degree of accuracy. A target image will be displayed on one of the beams when a target is present in the seeker field of view. Magnetic position sensors react with magnets on the rotating gyroscopic mass and the prism to indicate where the target is located in the seeker field of view when a target image is displayed on the detector.

DESCRIPTION OF THE PREFERRED EMBODIMENT

Figure 1:
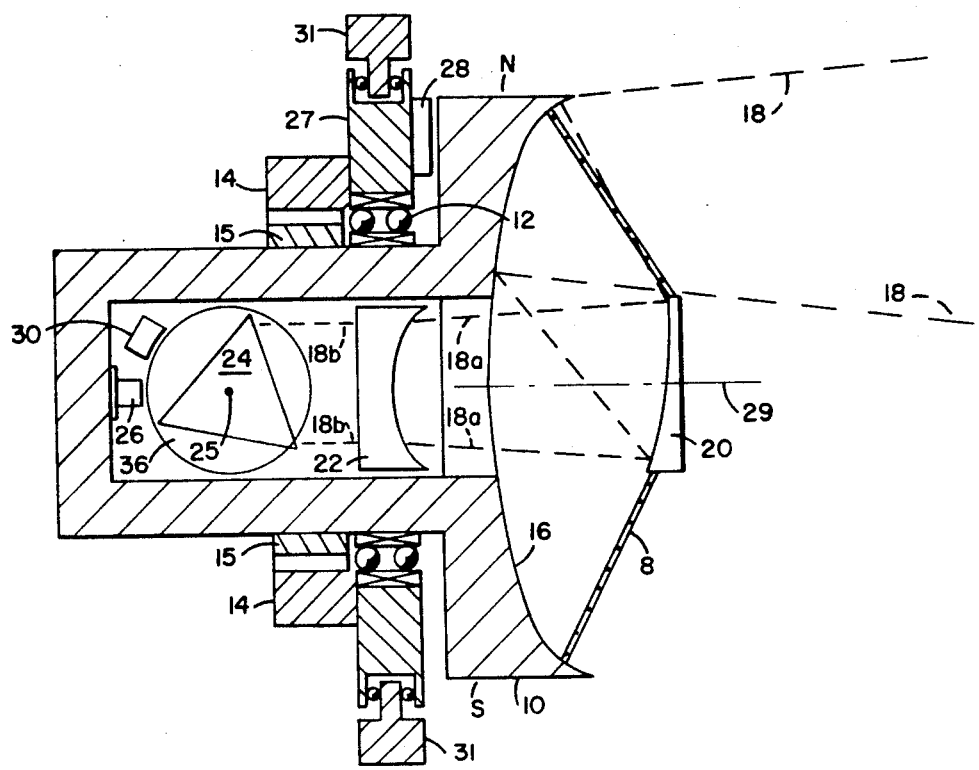
FIG. 1 is a schematic diagram of the present invention.

Referring now to FIG. 1, a spin stabilized gyroscopic mass 10 is driven by spin motor 14 having windings adjacent to and concentric with magnetic windings 15 on mass 10. Motor 14 is stationary on inner gimbal ring 27 and imparts rotational motion to gyroscopic mass 10. Mass 10 is rotated on a train of bearings 12. Optical elements of the target seeker are carried by and rotate with mass 10, and include parabolic reflector 16 cut in a face of mass 10, slanted mirror 20 facing reflector 16, focusing lens 22 and detector 26. The focusing lens focuses images from the slanted mirror onto the detector. Detector 26 may be an infrared detector for detecting infrared energy reflected from a target. Alternately, detector 26 may either be a photocell for detecting light or a laser detector for detecting laser energy. With this arrangement of optical elements, energy beams 18 from the seeker field of view are passed over the detector in a circular pattern.

The novelty of this invention is in rotating prism 24 between lens 22 and detector 26 to provide a more accurate sweep pattern for the beams. The prism is rotated on an end shaft of motor 36, whose axis is along axis 25 and is orthogonal to axis 29. Prism 24 and motor 36 are also carried by and rotate with mass 10. The circular beams that are transmitted through lens 22 are bent by rotating prism 24 into curved radial beams which are swept over detector 26. All of the optical elements, including reflector 16, mirror 20, lens 22, prism 24 and detector 26, are symmetrically positioned along seeker spin axis 29. Prism 24 is glued on the end shaft of motor 36, with the end shaft and axis 25 having the same centerline.

Parabolic reflector 16 gathers energy beams 18 from the seeker field of view and reflects these energy beams to mirror 20, held on mass 10 by support 8. This support may be made of some material that allows the incoming energy beams to pass therethrough to reflector 16 yet provides sturdy support. Support 8 could be a temperature-stable solid optical glass or some non-transparent web material. Reflector 16 is, in effect, a two-degree-of-freedom gyro in which one degree of freedom is about gimbal axis 31 and a second degree of freedom is about a second gimbal axis (not shown) that is orthogonal to gimbal axis 31. Gyroscopic mass 10 may then be precessed up, down, left or right to align with a target. Beams 18 are reflected from reflector 16 to mirror 20 and are rereflected from mirror 20 as beams 18a to lens 22 in an off-axis catadioptric system. Beams 18a are then collimated by lens 22 into beams 18b and are transmitted to rotating prism 24. Beams 18b that are transmitted through rotating prism 24 are refracted and are swept across detector 26.

Figure 3:
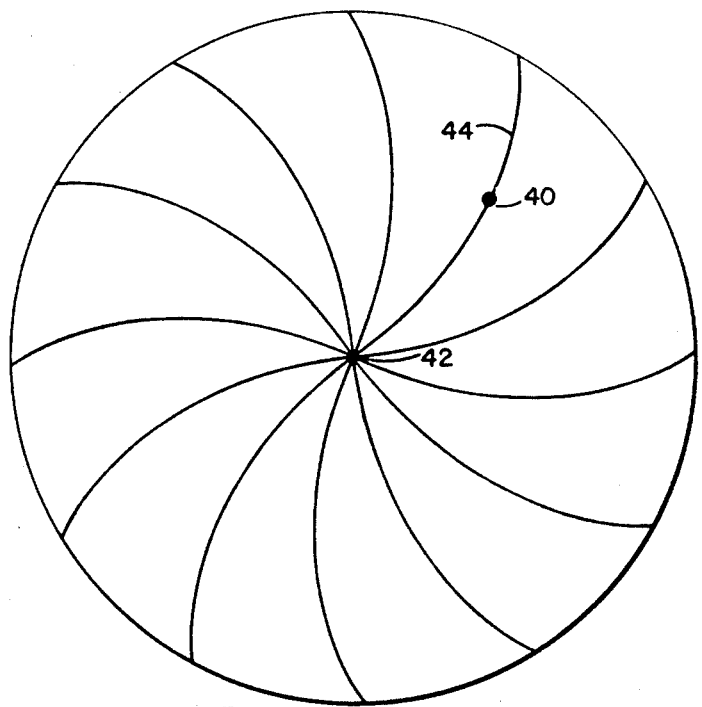
FIG. 3 is an illustration of the curved radial beams swept over the detector.
Figure 2:
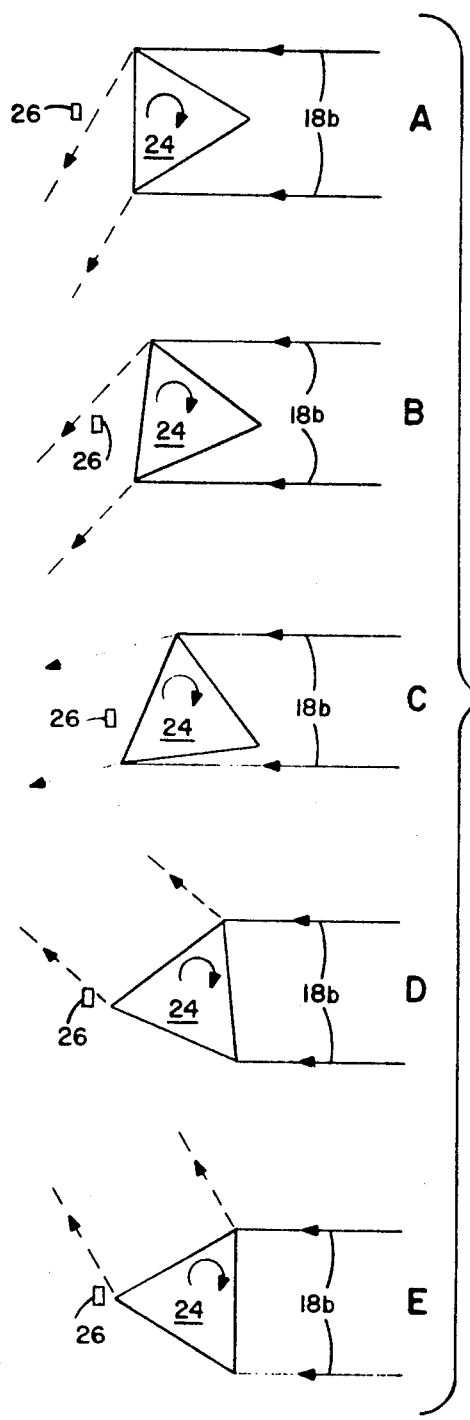
FIGS. 2(A), 2(B), 2(C), 2(D), and 2(E) are illustrated incremental steps of the energy beams as refracted by the rotating prism.

FIGS. 2(A), 2(B), 2(C), 2(D), and 2(E) illustrate incremental steps of clockwise rotation of prism 24 and the resulting sweep direction of beams 18b (shown by arrows) that are swept across detector 26. The beams are swept across detector 26 in curved radials, as shown in FIG. 3. Prism 24 bends the incoming energy beams over detector 26 one beam at a time for each flat surface of the prism which passes adjacent the detector.

Referring to FIG. 3, each beam is bent a different amount from center 42 outward as prism 24 is rotated. Prism 24 is shown as an isosceles prism but may be a prism with more than three flat surfaces. With the use of an isosceles prism, one complete rotation of the gyroscopic mass 10 about the seeker spin axis 29, along with one third of a revolution of prism 24 about prism spin axis 25, causes a sweep of one radial beam, for example, radial beam 44 of FIG. 3. If a target is in the field of view when radial beam 44 is swept across the detector, a target image, represented by numeral 40, will be transmitted through the optical elements to detector 26. An electrical output signal is generated from detector 26 and is applied to an electronic signal processor (not shown) when a target image is present on one of the radial beams. The position of the target in the seeker field of view is determined by position sensors 28 and 30. Position sensors 28 and 30 may be the magnetic type. If the position sensors are the magnetic type, a magnet on gyroscopic mass 10 and a magnet on an end shaft of motor 36, positioned adjacent prism 24, react with windings in sensors 28 and 30, respectively. Both position sensors are stationary with respect to the rotating magnets from which the sensor reacts. Sensor 28 is stationary on gimbal ring 27 and sensor 30 is secured to mass 10 adjacent the rotating end shaft of motor 36. The output of position sensor 28 is a continuous sinusoidal signal that is derived from a magnet on gyroscopic mass 10. The magnet is shown in FIG. 1 with N and S poles 180 electrical degrees apart. Resolution of this continuous sinusoidal signal may be had by feeding the signal to an analog-to-digital converter (not shown). A converted signal at the output of the analog-to-digital converter is fed to the signal processor for correlation with the target image output from detector 26 to accurately determine where the target is in the seeker field of view. The 360 electrical degrees of one complete cycle of the sinusoidal signal corresponds with the 360° around the seeker field of view. The magnitude and polarity of the sinusoidal signal from sensor 28 at the instant a target image is displayed on detector 26 indicates the position that the target is located in degrees around the seeker field of view from some imaginary reference line. Additionally, the distance outward from the spin axis of the seeker that the target image is displayed on detector 26 indicates where a target is located in the seeker field of view according to where a magnet is positioned on the end shaft of motor 36 when the image is displayed on the detector. A continuous sinusoidal output from sensor 30 is fed to a second analog-to-digital converter (not shown) and on to the signal processor in the same manner as the output from sensor 28. By using an isoscles prism, the 360 electrical degrees of one complete cycle of this sinusoidal signal is related with three sweeps of the radial beams. The magnitude and polarity of the sinusoidal signal from sensor 30 at the instant a target image is displayed on one of the radial beams on detector 26 indicates the direction and the distance that the target is from a center line of the seeker spin axis. Position sensors 28 and 30, therefore, furnish continuous signals to the signal processor for indicating the position of the target in the seeker field of view when a target image is displayed on detector 26. The output of sensor 28 may also furnish an input to a speed control circuit (not shown) for controlling the rotational speed of a gyroscopic mass 10.

The sweep direction of the beams across detector 26 may be from center 42 outward, or from the outermost part toward center 42, depending on the synchronization of the signal processor connected with rotating prism 24 and detector 26. The signal processor may be set to start the sweep pattern, for example, when the magnet on the end shaft of motor 36 passes sensor 30. The target image 40 is then accurately determined as being a certain distance from center 42 of the beam patterns. The seeker may then be torqued to align the target along the center line of the seeker spin axis.

In summary, the invention is a novel arrangement of a rotating prism added to and synchronized with a conventional arrangement of optical elements carried on and driven by a spinning gyroscopic mass. Energy beams are transmitted through the optical elements and the prism to a detector. The energy beams pass through the conventional arrangement of optical elements in a circular sweep path. This circular sweep path of beams is refracted by the rotating prism into a series of linear curved radial beams that are swept across the detector. If a target is within the field of view of the seeker, an image of this target will be displayed on one of the radial beams with a higher degree of accuracy than was possible with the previous circular beam sweep.

We claim:

1. In an optical scanning target seeker for use in a target pursuit vehicle, a gyroscopic mass having a spin axis being the optical scanning target seeker spin axis, a means for spinning said gyroscopic mass about said seeker spin axis, optical elements positioned along said seeker spin axis, said optical elements carried within said gyroscopic mass for transmitting a target image to a detector; the improvement comprising: a prism mounted on a prism spin axis orthogonal to said seeker spin axis, and means for rotating said prism wherein said gyroscopic mass and prism rotate with respect to each other to sweep linear curved radial beams of the seeker field of view over said detector for locating the position of a target image on said detector in relation to the center of said detector; wherein said optical elements include a parabolic mirror cut into said gyroscopic mass and having a central opening, a slanted mirror positioned facing said parabolic mirror, a focusing lens and a detector, with said focusing lens positioned within said gyroscopic mass for focusing images reflected from said slanted mirror onto said rotating prism, whereby when energy beams from a target in the seeker field of view is reflected on said detector to display a target image on said detector for determining the position of said target in the field of view of said seeker.

2. The optical scanning target seeker as set forth in claim 1 wherein said means for spinning said gyroscopic mass and means for rotating said prism are synchronized motors.

* * * * *